United States Patent Office

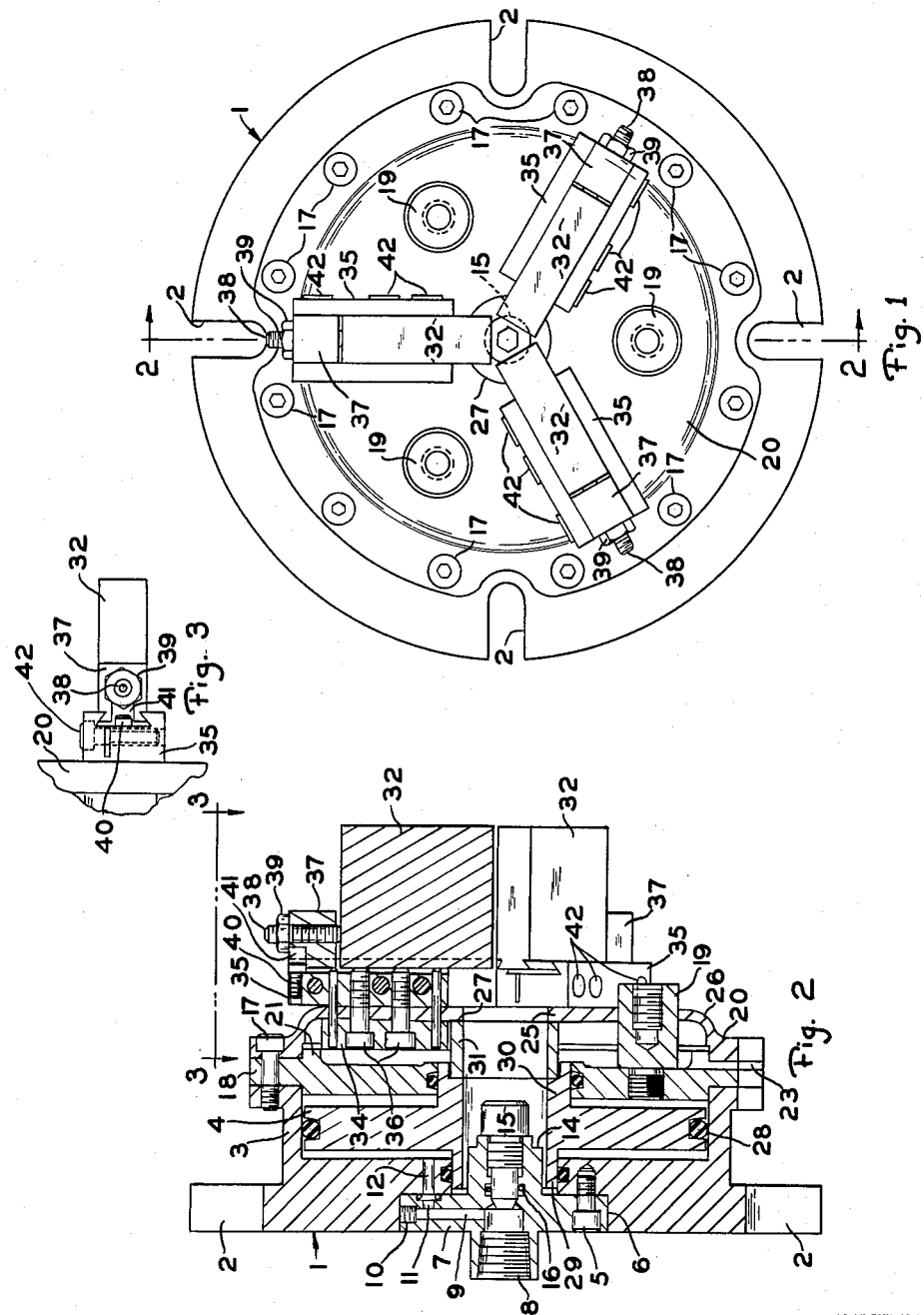

2,974,964
Patented Mar. 14, 1961

2,974,964

DIAPHRAGM CHUCK

Milton L. Benjamin, Shaker Heights, and Franklyn E. Winnen, Cleveland, Ohio, assignors to Erickson Tool Company, Solon, Ohio, a corporation of Ohio Filed Apr. 2, 1958, Ser. No. 725,899

6 Claims. (Cl. 279—4)

The present invention relates generally as indicated to a diaphragm chuck of that type wherein a laterally flexible diaphragm carries adjustable workpiece-gripping jaws, the diaphragm being laterally flexed as by a pneumatically actuated piston to cause the jaws to move out of gripping engagement with a workpiece.

It is one principal object of this invention to provide a simplified and efficient form of diaphragm chuck in which the peripheral portion of the diaphragm, at which the stresses due to lateral flexing are concentrated, is substantially continuous and uninterrupted so as to eliminate diaphragm failure or rupture.

It is another object of this invention to provide a diaphragm chuck embodying a strong and simple form of jaw assembly in which jaw mounting bases are bolted directly to the outer face of the diaphragm through the use of cleats located behind the diaphragm without requiring the usual welding or brazing operations that have a tendency of warping or distorting the diaphragm.

It is another object of this invention to provide a diaphragm chuck in which the jaw mounting bases thereof are formed with radially extending dovetail grooves and are radially slotted for tightly clamping the dovetail ribs or tenons of plain, solid jaws, the jaws themselves thereby being inexpensive to manufacture and to replace.

It is another object of this invention to provide in a diaphragm chuck a novel stop block arrangement which carries an adjusting screw by which accurate radial adjustments of the respective jaws may be made.

It is another object of this invention to provide a diaphragm chuck that has peripheral slots or passages through which coolant or lubricant together with grit, chips, or other foreign matter entering the space behind the diaphragm is discharged by centrifugal force when the chuck rotates or is drained by gravity when the chuck is stationary.

It is another object of this invention to provide a diaphragm chuck which has a novel form of pneumatic actuator in the form of a cylinder and piston assemblage arranged to effectively seal the chambers on opposite sides of the piston from entry of coolant or lubricant together with grit, chips or the like thereinto.

It is another object of this invention to provide a diaphragm chuck having a novel form of actuator which transmits flexing force to the diaphragm as a consequence of the movement of the piston in one direction.

It is another object of this invention to provide a novel form of inlet fitting through which fluid under pressure enters the chuck cylinder to act on the piston therein, such fitting additionally being formed to provide an adjustable stop means for the end of a workpiece that is to be gripped between the jaws mounted on the diaphragm.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

Fig. 1 is a front elevation view of one embodiment of the present invention;

Fig. 2 is a cross-section view taken substantially along the line 2—2, Fig. 1;

Fig. 3 is a fragmentary top plan view as viewed downwardly along the line 3—3, Fig. 2.

Referring now more particularly to the drawings, the reference numeral 1 denotes the chuck mounting plate which is formed with radial slots 2 around its periphery by which said mounting plate is adapted to be mounted on the end of a machine tool spindle, the spindle and mounting screws not being shown herein. Optionally, the mounting plate 1 may be bolted on the table or base of a drill press, milling machine or the like.

Projecting forwardly from the mounting plate 1 is a tubular portion 3 which constitutes a cylinder in which a piston 4 is axially reciprocable. Secured by screws 5 in a cylindrical recess 6 formed in the rear face of the mounting plate 1 is a fitting 7 which is formed with a threaded inlet port 8 to which the end of a fluid pressure supply pipe (not shown) is adapted to be connected. The fitting 7 is formed with a radially extending passage 9 which is closed as by means of the pipe plug 10. Intersecting the radial passage 9 is an axially extending passage 11 which registers with a passage 12 extending through the mounting plate into the cylinder 3. The joint between the fitting 7 and the mounting plate 1 may be sealed as by means of a conventional O-ring.

The fitting 7 is also provided with an axially forwardly extending boss 14 which is internally threaded to receive the stop screw 15 against which the end of a workpiece is adapted to be abutted to accurately locate a particular portion thereof which is to be ground, milled, or otherwise worked upon. The joint between the stop screw 15 and the fitting 7 may be sealed as by means of the O-ring 16 and the friction between the O-ring 16 and the stem of the screw 15 will serve to retain the latter in desired adjusted position. Screws 15 having different thicknesses of heads may be substituted, if desired, so that the screw may be tightened with the head thereof engaging the end of the boss 14.

Secured to the end of the cylinder 3, as by a series of circularly arranged screws 17 is a backup plate 18 which constitutes not only the outer end wall of the cylinder but also constitutes a mount for a series of stop mounting members 19 that are threaded for receiving stop screws or studs (not shown). The screws 17 also serve to clamp the peripheral flange of a laterally flexible diaphragm 20 against the backup plate 18. The annular pilot portion 21 of the backup plate 18 is radially slotted as at 23 so that coolant or lubricant together with grit, chips, or other foreign matter that may find its way into the space between the diaphragm 20 and the backup plate 18 may drain therefrom or be thrown out therefrom by centrifugal force as the chuck rotates.

The peripheral flange of the diaphragm 20 is laterally offset from the laterally flexible portion 25, the flange and flexible portion being joined together by a well-rounded and continuous portion 26 which can accommodate lateral flexing stresses without danger of rupture of the diaphragm as the central portion is flexed laterally with respect to the portion 26. As shown, the portion 25 of the diaphragm is of minimum thickness at 26 and becomes progressively thicker toward the central opening 27.

The piston 4 previously referred to is equipped with an O-ring 28 or like packing ring to make sealed contact with the wall of the cylinder 3. The piston 4 also is formed with tubular rod portions 29 and 30 which are telescoped in the central bore of the mounting plate 1 and in the central bore of the backup plate 18, respectively. As shown, O-rings may be employed to establish leak-proof sliding joints.

As is now evident from the foregoing description, when fluid under pressure, such as air, is admitted into the inlet port 8 it will reach the space between the mounting plate 1 and the left side of piston 4 by way of the radial passage 9 and the aligned axial passages 11 and 12 in the fitting 7 and mounting plate 1, respectively. The fluid under pressure thus acting on the piston 4 will move it and the actuator 31 toward the right, as viewed in Fig. 2, whereupon the flexible portion 25 of the diaphragm 20 will be flexed toward the right to effect outward swinging movement of the jaws 32 so that a workpiece may be inserted between the inner ends of the jaws and into abutment with the stop screw 15. When the fluid under pressure is released or vented, the diaphragm 20 will tend to return back to its original unflexed condition thereby moving the actuator 31 and piston 4 toward the left and causing the jaws 32 to move inwardly to grip a workpiece therebetween.

When it is desired to internally grip a workpiece, the workpiece may be placed around the jaws 32 and into engagement with the stop screws mounted in the stop mounting members 19 when the diaphragm is in its unflexed condition. In that case, when fluid under pressure is admitted into the chamber between the mounting plate 1 and the left side of piston 4 the outwardly swinging of the jaws 32 will effect gripping of the interior of the workpiece. However, for such internal chucking it is preferred to modify the chuck so that actuator 31 will draw the central portion of the diaphragm 20 toward the left responsive to movement of the piston 4 to the left. In that case, fluid under pressure will be conducted from port 8 into the space between the backup plate 18 and the right side of piston 4. Thus, when fluid under pressure is admitted into such right-hand chamber between the piston 4 and the backup member 18, the diaphragm 20 will be flexed toward the left to swing the jaws 32 inwardly to permit placement of a workpiece therearound, whereupon release of the fluid under pressure will allow the diaphragm 20 to move toward its unflexed condition, whereupon the jaws 32 will swing outwardly to grip the workpiece.

An important feature of the present invention is that when the fluid under pressure acting on the piston 4 is released, the relaxing of the pressure contact between the piston 4 and the end of the actuator 31 in no way tends to allow entrance of foreign matter into the piston chambers, since both chambers are at all times sealed by means of the packed joints between piston rod portions 29 and 30 and the mounting plate 1 and the backup plate 18, respectively.

With reference to the jaws 32 aforesaid, there is pinned to the rear face of the diaphragm 20 a series of cleats 34, herein three in number, and pinned to the front face are the slotted jaw-mounting bases 35. The diaphragm portion 25 is firmly clamped between the cleats 34 and the jaw mounting bases 35 as by means of screws 36, the heads of which bear on the cleats 34 and the threaded portions of which have threaded engagement with the jaw-mounting bases 35.

Each jaw-mounting base 35 is formed with a radially extending dovetail groove throughout its length and with a radially extending slot disposed off center as shown and also extending throughout the length of the jaw base.

Carried by each jaw base 35 adjacent the outer end thereof is a stop block 37 which is formed with a dovetail rib or tenon fitted in the dovetail groove of the jaw base, and each stop block 37 carries an adjusting screw 38 which may be locked in predetermined position as by means of the lock nut 39. The outermost position of each stop block 37 is determined by the stop screw 40 that is threaded into the jaw base 35 adjacent the outer end thereof, the stop block 37 being formed with a recess 41 which abuts the side of the head of said stop screw 40.

Each jaw 32 comprises a plain, solid block of metal formed with a dovetail rib or tenon which slidably fits in the dovetail groove of the respective jaw-mounting base 35. Thus, by manipulating the adjusting screws 38, the jaws 32 may be moved inwardly so as to properly grip a workpiece therebetween when the diaphragm 20 tends to return to its undeformed or unflexed condition. After the jaws 32 have been adjusted as aforesaid, the clamping screws 42 may be tightened to draw the sides of the dovetail grooves of the jaw bases 35 into tight frictional engagement with the dovetail ribs or tenons of the respective jaws 32.

It is to be understood that the inner faces of the jaws 32 may be shaped as desired to grip workpieces of different shapes. In the present case the inner faces of the jaws are plane and if a cylindrical workpiece were inserted it would be gripped at three places between the three jaws.

The present arrangement provides for a secure mounting of the jaws 32 since when the clamping screws 42 are tightened there is a tight wedging action that draws the jaws toward the jaw bases 35 to secure firm and widespread support therefor.

The jaw mounting bases 35 are slotted off center, as shown, so as to clear the pins and the screws 36 which preferably pass through the center portions of the jaw bases. While not shown herein, the cleats 34 will preferably be of somewhat segmental shape to avoid areas of high stress concentration and, of course, the holes through which the stop mounting members 19 pass are so widely spaced from one another and are located inward of the periphery of the diaphragm 20 as to avoid danger of cracking or splitting of the diaphragm from one hole to the next.

Other modes of applying the principle of the invention may be employed, change being made as regards the details described, provided the features stated in any of the following claims, or the equivalent of such, be employed.

We therefore particularly point out and distinctly claim as our invention:

1. In a piston-actuated diaphragm chuck of the type comprising a mounting plate, a backup plate, and a diaphragm peripherally secured together, said mounting plate and said backup plate defining a cylindrical chamber therebetween for such piston, means forming a passage in said mounting plate through which fluid under pressure is conducted into such chamber to act on one side of such piston; a radially extending peripheral flange by which said diaphragm is secured to the peripheral portion of said backup plate and a laterally flexible center portion that is laterally offset from, and has a rounded, continuous junction with said flange, said piston having integral oppositely extending tubular portions that are axially slidable in central bores formed in the respective plates to seal such chamber from ingress of foreign matter, workpiece gripping jaws mounted on the center portion of said diaphragm for relative radial movement upon flexing of said center portion, and an actuator interposed between that one of the oppositely extending portions of said piston which is slidable in the central bore of said backup plate and the central portion of said diaphragm to transmit axial force from said piston to said diaphragm and thereby flex the latter as aforesaid.

2. The chuck of claim 1 wherein said means forming the passages to such chamber comprises a fitting secured centrally of said mounting plate, said fitting being formed with an inlet port adapted for connection with a fluid pressure source and providing a passage that registers with a passage extending axially into such chamber at a region radially outward of that one of the oppositely extending portions which is axially slidable in the center bore of said mounting plate.

3. The chuck of claim 1 wherein the peripheral portion of said backup plate and the peripheral flange of said diaphragm define radially extending passages for drainage of foreign matter that may enter the space between said backup member and the laterally offset center portion of said diaphragm.

4. In a diaphragm chuck of the type comprising a mounting plate, a backup plate, and a diaphragm peripherally secured together, said mounting plate and said backup plate defining a cylindrical chamber therebetween, said diaphragm having a laterally flexible center portion, a piston axially movable in such chamber, means forming a passage in said mounting plate through which fluid under pressure is conducted into such chamber to act on one side of said piston, workpiece gripping jaws mounted on such center portion for relative radial movement upon flexing of said center portion, and an actuator interposed between said piston and the center portion of said diaphragm to transmit axial force from said piston to said diaphragm and thereby flex the latter as aforesaid; a jaw base secured to said diaphragm and formed with a radially extending dovetail grove radially slotted between the sides thereof thus to render said jaw base yieldably contractible, a jaw formed with a dovetail rib radially adjustable in such dovetail groove, clamping screws in said jaw base effective to draw the opposite sides of such dovetail groove into frictional clamping engagement with said dovetail rib.

5. The chuck of claim 4 wherein a stop block similarly has a dovetail rib disposed in such dovetail groove radially outwardly of said jaw, wherein a stop screw threaded in said jaw base is engaged by said stop block to determine the radially outermost position of the latter and wherein an adjusting screw threaded into said stop block bears on said jaw to move it radially inwardly when said clamping screws are loosened.

6. The chuck of claim 4 wherein cleats aligned with said jaw bases are disposed on the opposite side of said diaphragm, and screw means are provided securely to clamp said diaphragm between said cleats and said jaw bases.

References Cited in the file of this patent

UNITED STATES PATENTS

| | | |
|---|---|---|
| 2,464,507 | Hohwart et al. | Mar. 15, 1949 |
| 2,491,611 | Hohwart et al. | Dec. 20, 1949 |
| 2,568,585 | Hohwart et al. | Sept. 18, 1951 |
| 2,577,656 | Hohwart et al. | Dec. 4, 1951 |
| 2,804,052 | Halladay | Aug. 27, 1957 |
| 2,893,210 | Muszynski | July 7, 1959 |